US011875774B2

(12) United States Patent
Imaizumi et al.

(10) Patent No.: US 11,875,774 B2
(45) Date of Patent: Jan. 16, 2024

(54) SOUND IMAGE LOCALIZATION DEVICE, SOUND IMAGE LOCALIZATION METHOD, AND PROGRAM

(71) Applicant: Nippon Telegraph and Telephone Corporation, Tokyo (JP)

(72) Inventors: Kenta Imaizumi, Musashino (JP); Kimitaka Tsutsumi, Musashino (JP); Atsushi Nakadaira, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 315 days.

(21) Appl. No.: 17/426,761

(22) PCT Filed: Jan. 17, 2020

(86) PCT No.: PCT/JP2020/001405

§ 371 (c)(1),
(2) Date: Jul. 29, 2021

(87) PCT Pub. No.: WO2020/158433

PCT Pub. Date: Aug. 6, 2020

(65) Prior Publication Data

US 2022/0101825 A1 Mar. 31, 2022

(30) Foreign Application Priority Data

Feb. 1, 2019 (JP) ................................ 2019-016881

(51) Int. Cl.
*G10K 11/34* (2006.01)
*H04R 1/32* (2006.01)
*H04R 1/40* (2006.01)

(52) U.S. Cl.
CPC .......... *G10K 11/343* (2013.01); *H04R 1/323* (2013.01); *H04R 1/403* (2013.01)

(58) Field of Classification Search
None
See application file for complete search history.

(56) References Cited

U.S. PATENT DOCUMENTS 5,715,317 A * 2/1998 Nakazawa ............. H04S 1/007 381/17
2007/0036366 A1* 2/2007 Konagai ................. H04R 3/12 381/61
2007/0165890 A1* 7/2007 Fusakawa .............. H04S 1/002 381/310

FOREIGN PATENT DOCUMENTS

JP 2012008156 1/2012
JP 2016163181 A * 9/2016

OTHER PUBLICATIONS

Boone et al., "Design of a Highly Directional Endfire Loudspeaker Array," Journal of Audio Engineering, May 2009, 57(5):309-325.
(Continued)

*Primary Examiner* — Ian J Lobo
(74) *Attorney, Agent, or Firm* — Fish & Richardson P.C.

(57) ABSTRACT

Provided is a sound image localizing device, a sound image localizing method, and a program that enable a virtual speaker to reproduce sound in a wide frequency band with high sound quality. A sound image localizing device 10 includes a directivity control filter design unit 11 that computes a directivity control filter from a desired directional characteristic, a filter coefficient correction unit 12 that corrects the directivity control filter computed by the directivity control filter design unit 11, and a convolution operation unit 13 that computes an output acoustic signal by performing convolution of an input acoustic signal and the directivity control filter corrected by the filter coefficient correction unit 12. Filters that respectively correspond to speakers constituting a speaker array are computed by the directivity control filter design unit 11 and the filter coeffi- (Continued)

cient correction unit 12, an acoustic beam is generated using directivity control by the speaker array, and the acoustic beam is caused to be reflected from a wall surface or a ceiling to generate a virtual sound source.

6 Claims, 9 Drawing Sheets

(56) References Cited

OTHER PUBLICATIONS

Sakamoto et al., "Sound Localization of Beamforming-Controlled Reflected Sound from Ceiling in Presence of Direct Sound," 144th Audio Engineering Society Convention, Milan, Italy, May 23, 2018, Paper 9949.

* cited by examiner $W_l(\omega)$ : FILTER CORRESPONDING TO l-th SPEAKER $G_{ml}(\omega)$ : TRANSFER FUNCTION FROM l-th SPEAKER TO CONTROL POINT L : NUMBER OF SPEAKERS $(1 \leq l \leq L)$ M : NUMBER OF CONTROL POINTS $(1 \leq m \leq M)$

SOUND IMAGE LOCALIZATION DEVICE, SOUND IMAGE LOCALIZATION METHOD, AND PROGRAM

CROSS-REFERENCE TO RELATED APPLICATIONS

This application is a National Stage application under 35 U.S.C. § 371 of International Application No. PCT/JP2020/001405, having an International Filing Date of Jan. 17, 2020, which claims priority to Japanese Application Serial No. 2019-016881, filed on Feb. 1, 2019. The disclosure of the prior application is considered part of the disclosure of this application, and is incorporated in its entirety into this application.

TECHNICAL FIELD

The present technology relates to a sound image localizing device, a sound image localizing method, and a program, and particularly to an acoustic reproduction technology that has a sound production effect of generating a virtual sound source at a desired position, rather than a speaker main body.

BACKGROUND ART

In recent years, reproduction methods of arranging a plurality of speakers are widely used in public viewing and at homes. Also, following the spread of imaging technologies related to 3D images and wide images, efforts are made regarding acoustics as well to realize reproduction that gives higher presence by generating a virtual sound source at a desired position, rather than a speaker main body. In particular, a virtual speaker is generated by controlling directivity of sound and causing the sound to be reflected from a wall surface through directivity control that is performed using a speaker that uses ultrasonic waves and has sharp directivity or a speaker array that is constituted by arranging a plurality of ordinary speakers. Ultrasonic speakers commonly demodulate ultrasonic waves into audible sound, and accordingly, the sound quality deteriorates due to distortion occurring in demodulation, and particularly, the treble range is difficult to reproduce. In view of reproduction of various types of contents such as music, directional reproduction that enables reproduction with high sound quality in a wide frequency band is needed.

Directivity Control Technology

The following describes directivity control technologies. Directivity control technologies are technologies of controlling a direction in which sound strongly propagates from speakers or a direction in which sound does not propagate from the speakers by arranging control points around a speaker array in which the plurality of speakers are arranged, designing filters that control the amplitude and the phase of the speakers based on characteristics of transfer from the speakers to the control points, and applying the filters to an input signal.

A representative method is design of a directivity control filter using the least squares method. FIG. 7 shows an observation system for explaining design of a directivity control filter using the least squares method. When a vector in which directivity control filters corresponding to respective filters are stored is represented by $w(\omega)=[w_1(\omega), w_2(\omega), \ldots, w_L(\omega)]^T$, and a signal that is observed at control points is represented by $d^O(\omega)=[d^O_1(\omega), d^O_2(\omega), \ldots, d^O_M(\omega)]^T$, the signal $d^O(\omega)$ is expressed as follows.

$$d^0(\omega) = G(\omega)w(\omega), \tag{1}$$

$$G = \begin{pmatrix} G_{11} & G_{12} & \ldots & G_{1L} \\ G_{21} & G_{22} & \ldots & G_{2L} \\ \vdots & \vdots & \ddots & \vdots \\ G_{M1} & G_{M2} & \ldots & G_{ML} \end{pmatrix}.$$

Here, $G(\omega)$ represents a transfer function matrix with M rows and L columns in which transfer functions $G_{m1}(\omega)$ from the speakers to the control points are stored, and $G_{m1}(\omega)$ is given by the following expression.

$$G_{ml} = \frac{e^{-jkr_{ml}}}{4\pi r_{ml}}. \tag{2}$$

Here, j represents an imaginary number $j=\sqrt{-1}$, k represents a wavenumber, and $r_{m1}$ represents a distance from an m-th control point to an l-th speaker. The least squares method for finding a directivity control filter is a minimization problem of finding a filter $w(\omega)$ that minimizes the sum of squares $\|e\|^2$ of errors between a desired directional characteristic $d(\omega)$ and a directional characteristic $d^O(\omega)$ observed at each control point. Accordingly, an objective function J to be minimized is expressed by the following expression.

$$J=\|e(\omega)\|^2=(d(\omega)-G(\omega))w(\omega))^H(d(\omega)-G(\omega)w(\omega)) \tag{3}$$

Here, the superscript H represents complex conjugate transposition. The following directivity control filter is found by solving the problem of minimizing the objective function J expressed by Expression (3) with respect to $w(\omega)$.

$$w(\omega) = \frac{G(\omega)^H d(\omega)}{G(\omega)^H G(\omega)}, \tag{4}$$

Directivity Control Technology Using Reflecting Plate

With regard to acoustic reproduction technologies for generating a virtual speaker by using reflection of sound, a method based on PTL 1 realizes local reproduction by controlling directivity such that the sum total of radiated sounds from a directional speaker and reflected sounds from a reflecting plate is the maximum at a desired point.

Filter Gain Suppression Using Penalty Term

When a filter for controlling the directivity of sound is designed, the computed filter includes a filter gain that affects a sound source output from the filter. Here, a filter gain $F_1^{gain}(\omega)$ that corresponds to an l-th speaker at an angular frequency $\omega$ is defined as follows.

$$F_l^{gain}(\omega)=|w_l(\omega)|=w_l(\omega)^*w_l(\omega). \tag{5}$$

Here, $w_l(\omega)$ represents a filter coefficient that corresponds to the l-th speaker. Also, the superscript * represents a complex conjugate. If the filter gain is large, an input signal increases in proportion to the filter gain, and a large load is applied to the speaker, which makes reproduction difficult. In terms of this, NPL 1 derived a filter for controlling directivity by using a penalty term, which will be described later, with respect to an objective function for deriving the filter. At this time, the sum of squares of filter coefficients was used as the penalty term to suppress the filter gain.

A directivity control filter of a case where the penalty term is used will be considered, taking a directivity control filter obtained using the least squares method as an example. If the penalty term is used with respect to the objective function J of Expression (3), the following expression is obtained.

$$J=\|e\|^2-\beta(\omega)\|w(\omega)\|^2, \tag{6}$$

Here, $\beta(\omega)$ is a regularization parameter that controls a relative weight between $\|e\|^2$, which is a loss term, and $\|w(\omega)\|^2$, which is the penalty term. Similarly to Expression (4), the following directivity control filter is found by solving a minimization problem regarding $w(\omega)$.

$$w(\omega)=\frac{G(\omega)^H d(\omega)}{G(\omega)^H G(\omega)+\beta(\omega)I}, \tag{7}$$

Here, I represents a unit matrix with L rows and L columns.

Sound Localization System Using Directivity Control and Reflection of Sound from Wall Surface FIG. 8 is a conceptual diagram of sound image localization that is performed using reflection of the directivity of sound. In FIG. 8, the reference sign 100 denotes a speaker array, the reference sign 101 denotes a virtual speaker, the reference sign 102 denotes a ceiling or a wall, the reference sign 103 denotes direct sound, the reference sign 104 denotes reflected sound, and the reference sign 105 denotes a sound hearing point. A method based on NPL 2 realizes upward sound image localization by causing sound to be reflected from a ceiling as shown in FIG. 8 through directional reproduction by a regular polyhedron speaker. At this time, a normalization matched filter is used to form the directivity in a wide frequency band while maintaining the sound quality.

FIG. 9 shows an observation system for designing a normalization matched filter. The normalization matched filter is obtained by giving a filter with which an observed signal and an input acoustic signal matches when the input acoustic signal is emitted from a speaker and is observed at a given target control point. Accordingly, a driving signal $W_l(\omega)$ that is given to an l-th speaker in the normalization matched filter can be designed in the frequency domain using the following expression.

$$W_l(\omega)=\frac{G_l(\omega)^*}{|G_l(\omega)|}. \tag{8}$$

Here, $\omega$ represents an angular frequency ($\omega=2\pi f$), f represents a frequency, and $G_l(\omega)$ represents a transfer function from the l-th speaker to the target control point. The transfer function $G_l(\omega)$ can be obtained through Fourier transformation of an impulse response $g_l(n)$.

$$G_l(\omega)=\mathcal{F}\{g_l(n)\} \tag{9}$$

Here, n represents a time term and F represents Fourier transformation. The normalization matched filter is found by performing this computation with respect to all speakers constituting a speaker array.

Also, regarding upward sound image localization, NPL 2 confirmed through experiments that a sound image was localized in the direction of reflected sound if a sound pressure difference between the reflected sound from a wall surface and direct sound from a speaker was larger than 5 dB.

CITATION LIST

Patent Literature

[PTL 1] Japanese Patent Application Publication No. 2012-008156

Non Patent Literature

[NPL 1] Marinus M. Boone, Wan-Ho Cho, Jeong-Guon Ih, "Design of a Highly Directivity Endfire Loudspeaker Array", Journal of the Audio Engineering Society 57.5 (2009): 309-325.

[NPL 2] Hiroo Sakamoto, Yoichi Haneda, "Sound Localization of Beamforming-Controlled Reflecte Sound from Ceiling in Presence of Direct Sound", in 144th Audio Engineering Society Convension paper 9949, 2018, May.

SUMMARY OF THE INVENTION

Technical Problem

According to NPL 2, it was confirmed that a sound image could be localized upward if the difference between reflected sound from the wall surface and direct sound from the speaker was larger than 5 dB. Accordingly, it is necessary to generate directional sound with high sound quality in a wide frequency band while suppressing direct sound from the speaker. However, this is difficult to realize through directivity control that is performed using commonly used conventional methods.

The method described in NPL 2 realizes directional reproduction that gives high sound quality and uses a wide frequency band. However, the directivity is not intentionally designed in this method, and accordingly, there is a problem in that, although the directivity can be formed, a desired directional characteristic cannot be given.

In a case where a directivity control filter is designed with respect to a wide frequency band, it is possible to design the filter, but the filter gain becomes large in a low frequency band, and accordingly, it is difficult to reproduce the low frequency band with the computed filter. In terms of this, NPL 1 suppresses the filter gain by using a penalty term that suppresses the filter gain. As the regularization parameter, which is the weight of the penalty term, the same value is experimentally used for all frequencies based on degrees of reproduction of the desired directional characteristic and the magnitude of filter gains at the respective frequencies. If the same regularization parameter is used for all frequencies, there is a problem in that optimum parameters cannot be given for the respective frequencies. Also, if regularization parameters are determined for the respective frequencies, it is necessary to set the same number of regularization parameters as the frequencies used, and it is difficult to experimentally set the regularization parameters. Additionally, there is a problem in that it is difficult to set an optimum parameter because there is a trade-off relationship between reproductivity of the desired directional characteristic and the magnitude of the filter gain.

In view of the conventional technologies described above, an object of the present invention is to provide a sound image localizing device, a sound image localizing method, and a program that enable a virtual speaker to reproduce sound in a wide frequency band with high sound quality.

Means for Solving the Problem

The gist of an invention according to a first aspect is a sound image localizing device that includes: a directivity control filter design unit configured to compute a directivity control filter from a desired directional characteristic; a filter coefficient correction unit configured to correct the directivity control filter computed by the directivity control filter design unit; and a convolution operation unit configured to compute an output acoustic signal by performing convolution of an input acoustic signal and the directivity control filter corrected by the filter coefficient correction unit, wherein filters that respectively correspond to speakers constituting a speaker array are computed by the directivity control filter design unit and the filter coefficient correction unit, an acoustic beam is generated using directivity control by the speaker array, and the acoustic beam is caused to be reflected from a wall surface or a ceiling to generate a virtual sound source.

The gist of an invention according to a second aspect is that, in the invention according to the first aspect, the filter coefficient correction unit performs computation such that a filter gain becomes constant, the filter gain being an absolute value of a filter coefficient at each frequency.

The gist of an invention according to a third aspect is a sound image localizing device that includes: an objective function setting unit configured to set an objective function from a desired directional characteristic; a constraint setting unit configured to set a linear or non-linear constraint; an optimization unit configured to compute an optimum filter coefficient from the objective function set by the objective function setting unit and the constraint set by the constraint setting unit; and a convolution operation unit configured to compute an output acoustic signal by performing convolution of an input acoustic signal and a directivity control filter that is computed by the optimization unit, wherein filters that respectively correspond to speakers constituting a speaker array are computed by the objective function setting unit, the constraint setting unit, and the optimization unit, an acoustic beam is generated using directivity control by the speaker array, and the acoustic beam is caused to be reflected from a wall surface or a ceiling to generate a virtual sound source.

The gist of an invention according to a fourth aspect is that, in the invention according to the third aspect, the constraint setting unit sets at least one of a constraint that makes the value of a filter gain constant at each frequency and a constraint relating to directional characteristics that is based on the desired directional characteristic.

The gist of an invention according to a fifth aspect is a sound image localizing method that includes: a directivity control filter designing step of computing a directivity control filter from a desired directional characteristic; a filter coefficient correction step of correcting the directivity control filter computed in the directivity control filter designing step; and a convolution operation step of computing an output acoustic signal by performing convolution of an input acoustic signal and the directivity control filter corrected in the filter coefficient correction step, wherein filters that respectively correspond to speakers constituting a speaker array are computed in the directivity control filter designing step and the filter coefficient correction step, an acoustic beam is generated using directivity control by the speaker array, and the acoustic beam is caused to be reflected from a wall surface or a ceiling to generate a virtual sound source.

The gist of an invention according to a sixth aspect is a sound image localizing method that includes: an objective function setting step of setting an objective function from a desired directional characteristic; a constraint setting step of setting a linear or non-linear constraint; an optimization step of computing an optimum filter coefficient from the objective function set in the objective function setting step and the constraint set in the constraint setting step; and a convolution operation step of computing an output acoustic signal by performing convolution of an input acoustic signal and a directivity control filter that is computed in the optimization step, wherein filters that respectively correspond to speakers constituting a speaker array are computed in the objective function setting step, the constraint setting step, and the optimization step, an acoustic beam is generated using directivity control by the speaker array, and the acoustic beam is caused to be reflected from a wall surface or a ceiling to generate a virtual sound source.

The gist of an invention according to a seventh aspect is a program for causing a computer to function as the sound image localizing device according to the first or second aspect.

The gist of an invention according to an eight aspect is a program for causing a computer to function as the sound image localizing device according to the third or fourth aspect.

Effects of the Invention

According to the present invention, it is possible to provide a sound image localizing device, a sound image localizing method, and a program that enable a virtual speaker to reproduce sound in a wide frequency band with high sound quality.

DESCRIPTION OF EMBODIMENTS

The following describes embodiments that are most suited to implement the present invention, by using the drawings.

Overview

As described above, in terms of the frequency band and the sound quality, it is difficult to generate a virtual speaker by generating an acoustic beam using directivity control performed through a conventional method and causing the acoustic beam to be reflected from a wall surface. A virtually generated speaker needs to support a wide frequency band as a single speaker and give high sound quality.

Figure 8:
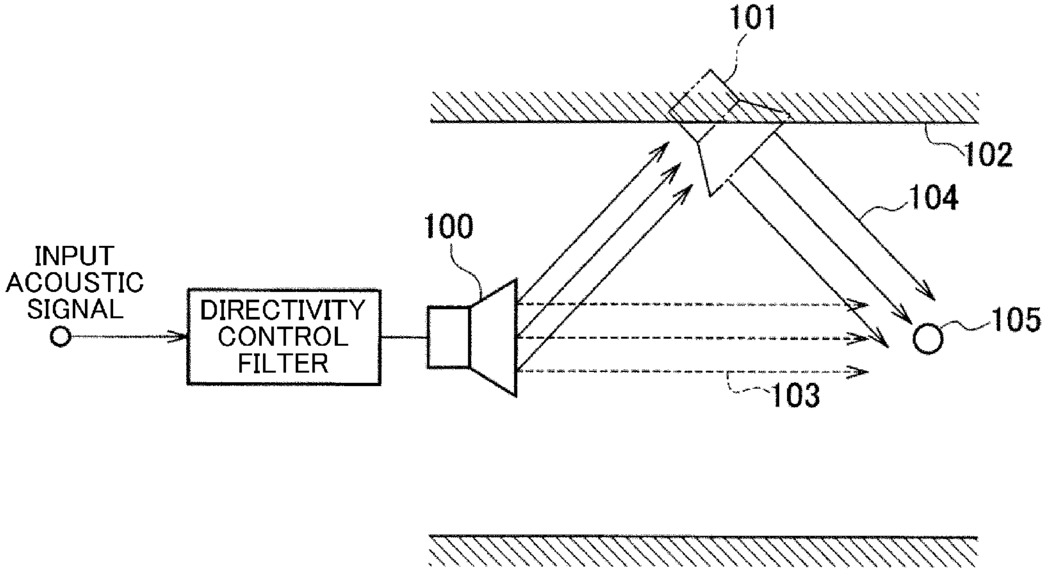
FIG. 8 is a conceptual diagram of sound image localization that is performed using reflection of the directivity of sound.
Figure 9:
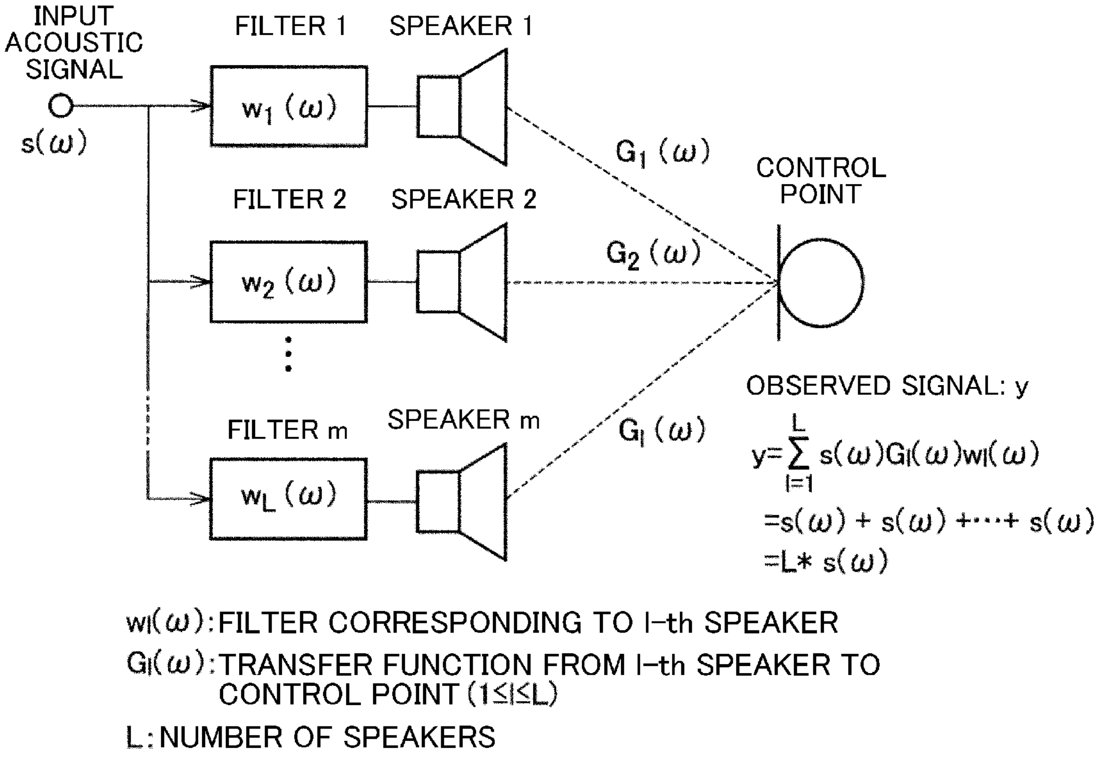
FIG. 9 is a diagram showing an observation system for designing a normalization matched filter.

In the embodiments of the present invention, a directivity control filter that can generate a desired directional characteristic is designed while restricting filter gains to be equal in all of the frequency band as in the case of NPL 2, rather than suppressing the filter gains using a penalty term as in the case of NPL 1, and a virtual speaker is generated using reflection from a wall surface as shown in FIG. 8.

First Embodiment

A first embodiment is an example in which directional reproduction that enables reproduction in a wide frequency band with high sound quality is realized by performing correction for restricting the filter gain with respect to a directivity control filter that is designed using a method such as the least squares method.

Figure 1:
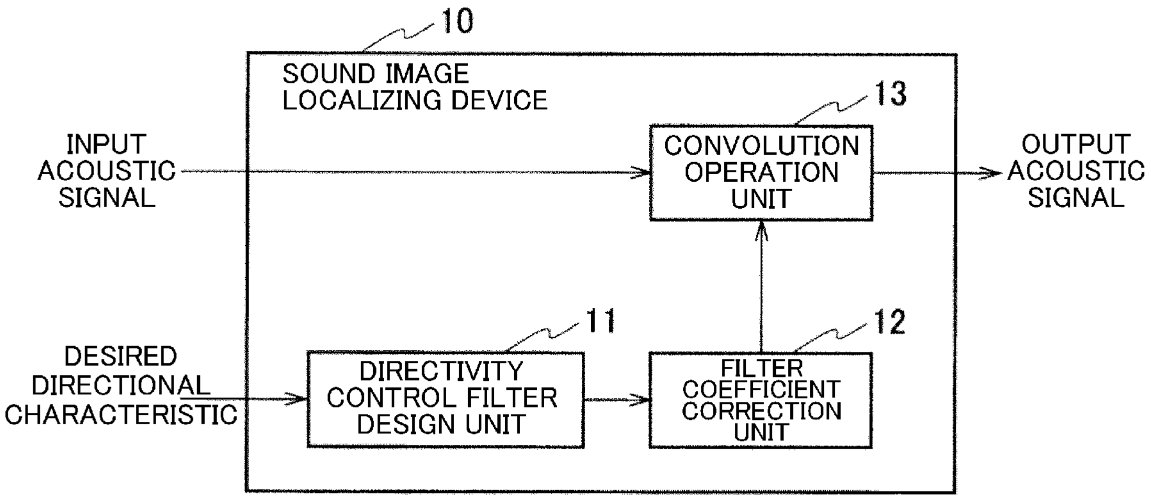
FIG. 1 is a diagram showing a configuration of a sound image localizing device according to a first embodiment.
Figure 2:
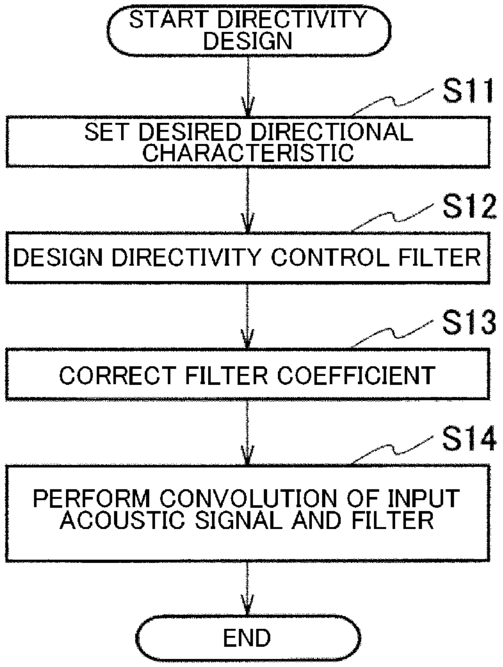
FIG. 2 is a flowchart showing operations of the sound image localizing device according to the first embodiment.

FIG. 1 is a diagram showing a configuration of a sound image localizing device 10 according to the first embodiment, and FIG. 2 is a flowchart showing operations of the sound image localizing device 10. The sound image localizing device 10 according to the first embodiment is a sound image localizing device that uses reflected sound, and includes a directivity control filter design unit 11, a filter coefficient correction unit 12, and a convolution operation unit 13. It goes without saying that the sound image localizing device 10 may also include another constituent element. For example, the sound image localizing device 10 may also include a directivity control filter shown in FIG. 8.

The directivity control filter design unit 11 computes a fundamental directivity control filter from a desired directional characteristic, which has been input (step S11-S12 in FIG. 2). Here, the desired directional characteristic corresponds to the vector d in Expression (1), and the fundamental directivity control filter corresponds to the vector w in Expression (1). At this time, the input desired directional characteristic does not particularly relate to a speaker, but corresponds to control points, and is set as desired on the outside of the sound image localizing device 10 (e.g., FIGS. 3 and 4, which will be described later, if there are 36 control points at intervals of 10 degrees on a circle surrounding the speaker, the desired characteristic d is a vector with 36 rows and 1 column). Although any method can be used to compute the fundamental directivity control filter so long as the method minimizes an error between the desired directional characteristic and a directional characteristic that is observed at an observation point when the fundamental directivity control filter is used, the least squares method can be used, for example.

The filter coefficient correction unit 12 computes a corrected directivity control filter from the fundamental directivity control filter, which has been input (step S13 in FIG. 2). The filter coefficient correction unit 12 computes the corrected directivity control filter by correcting the fundamental directivity control filter such that the filter gain becomes constant, the filter gain being the absolute value of a filter coefficient at each frequency. For example, focusing on a frequency of the fundamental directivity control filter, a filter coefficient corresponding to the frequency is divided by the absolute value of the filter coefficient and the result is multiplied by a constant determined in advance. As a result of this processing being carried out with respect to all frequencies of interest, the filter gain can be made constant at each frequency.

The convolution operation unit 13 computes an output acoustic signal from an input acoustic signal, which has been input, and the corrected directivity control filter (step S14 in FIG. 2). The convolution operation unit 13 computes the output acoustic signal by performing convolution of the input acoustic signal and the directivity control filter.

An acoustic signal that corresponds to the desired directional characteristic can be reproduced by reproducing the output acoustic signal from a speaker array.

Method for Setting Directional Characteristic

Figure 3:
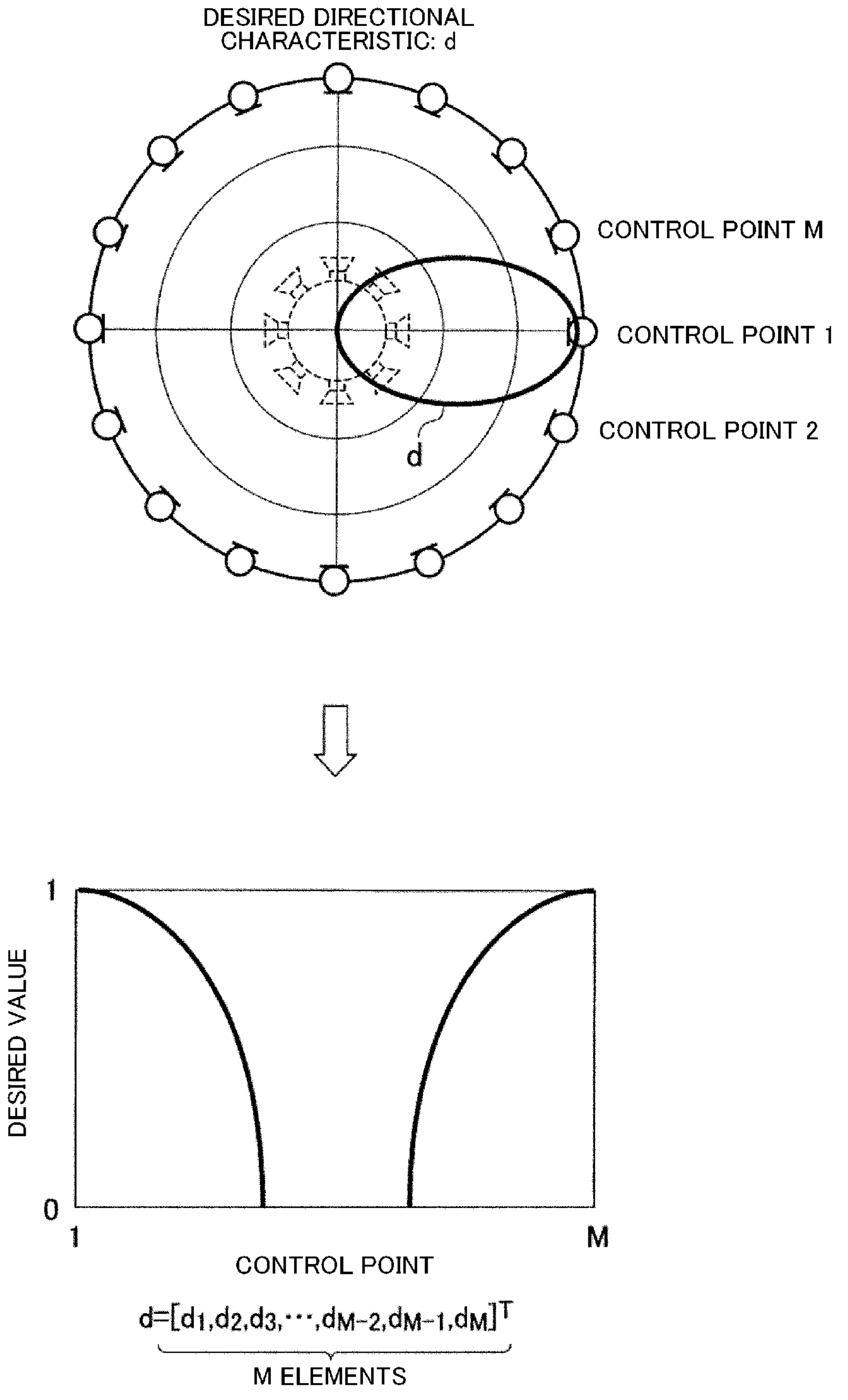
FIG. 3 is a diagram showing a method for setting a directional characteristic in the sound image localizing device according to the first embodiment.

FIG. 3 shows a case where the shape of directivity (directional characteristic) that is desired to be obtained is definitely determined. Here, an observation system that includes M control points will be considered. If there are 36 control points at intervals of 10 degrees on a circle surrounding a speaker, for example, the desired characteristic d is a vector with 36 rows and 1 column. In such a case, $d(\omega)=[d_1, d_2, d_3, \ldots, d_{M-2}, d_{M-1}, d_M]^T$ is the desired directional characteristic as shown in FIG. 3.

Figure 4:
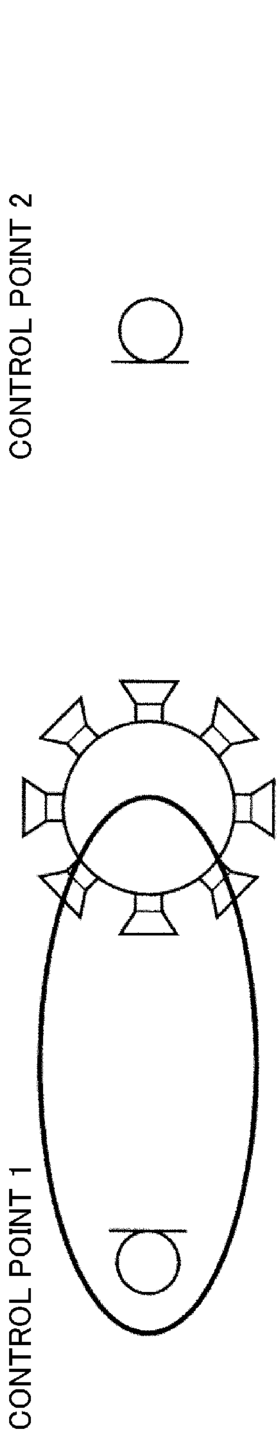
FIG. 4 is a diagram showing a method for setting a directional characteristic in the sound image localizing device according to the first embodiment.

FIG. 4 shows a case where the shape of directivity (directional characteristic) that is desired to be obtained is not definitely determined. Here, assume that there is a condition to be satisfied, for example, "sound is to be heard by a person who is at a control point 1 and the sound is not to be heard by a person who is at a control point 2". In such a case, the desired directional characteristic also includes maximizing the difference between a sound pressure observed at the control point 1 and a sound pressure observed at the control point 2 (control point 1>control point 2). That is, the desired directional characteristic is obtained by modeling the above-described condition.

As described above, the sound image localizing device 10 according to the first embodiment includes the directivity control filter design unit 11 that computes a directivity control filter from a desired directional characteristic, the filter coefficient correction unit 12 that corrects the directivity control filter computed by the directivity control filter design unit 11, and the convolution operation unit 13 that computes an output acoustic signal by performing convolution of an input acoustic signal and the directivity control filter corrected by the filter coefficient correction unit 12. Filters that respectively correspond to speakers constituting a speaker array are computed by the directivity control filter design unit 11 and the filter coefficient correction unit 12, an acoustic beam is generated using directivity control by the speaker array, and the acoustic beam is caused to be reflected from a wall surface or a ceiling to generate a virtual sound source. Thus, it is possible to provide the sound image localizing device 10 that enables the virtual speaker to reproduce sound in a wide frequency band with high sound quality.

Also, it is desirable that the filter coefficient correction unit 12 performs computation such that a filter gain becomes constant, the filter gain being the absolute value of a filter coefficient at each frequency. Thus, desired directional reproduction can be realized.

Note that the meaning of "a wall surface or a ceiling" in the expression "the acoustic beam is caused to be reflected from a wall surface or a ceiling" should be widely interpreted. That is, "a wall surface or a ceiling" includes what reflects the acoustic beam similarly to a wall surface or a ceiling.

Second Embodiment

The following describes a second embodiment. Note that the following mainly describes differences from the first embodiment, and detailed descriptions of aspects similar to those in the first embodiment will be omitted.

The second embodiment is an example in which desired directional reproduction is realized by designing a filter by solving an optimization problem to which a function that forms a desired directional characteristic is given as an objective function and a non-linear equality constraint that restricts the filter gain to a constant value is given as a constraint.

Figure 5:
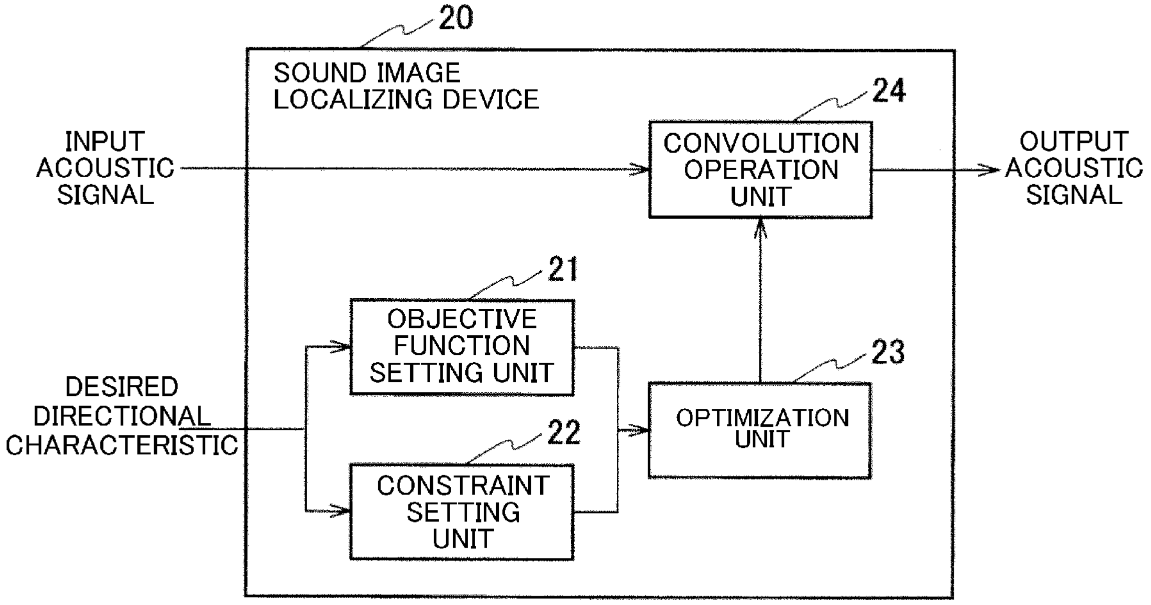
FIG. 5 is a diagram showing a configuration of a sound image localizing device according to a second embodiment.
Figure 6:
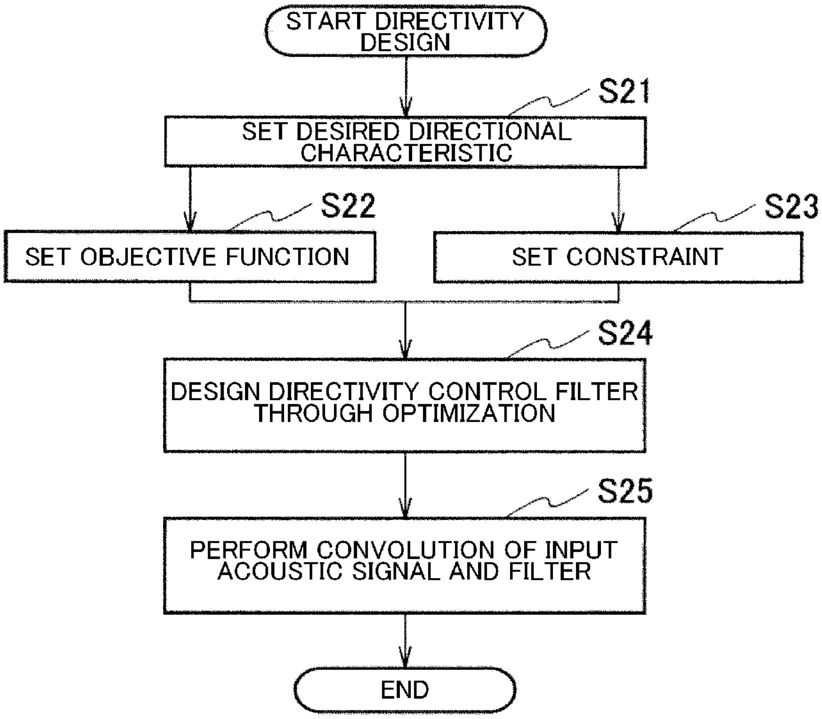
FIG. 6 is a flowchart showing operations of the sound image localizing device according to the second embodiment.
Figure 7:
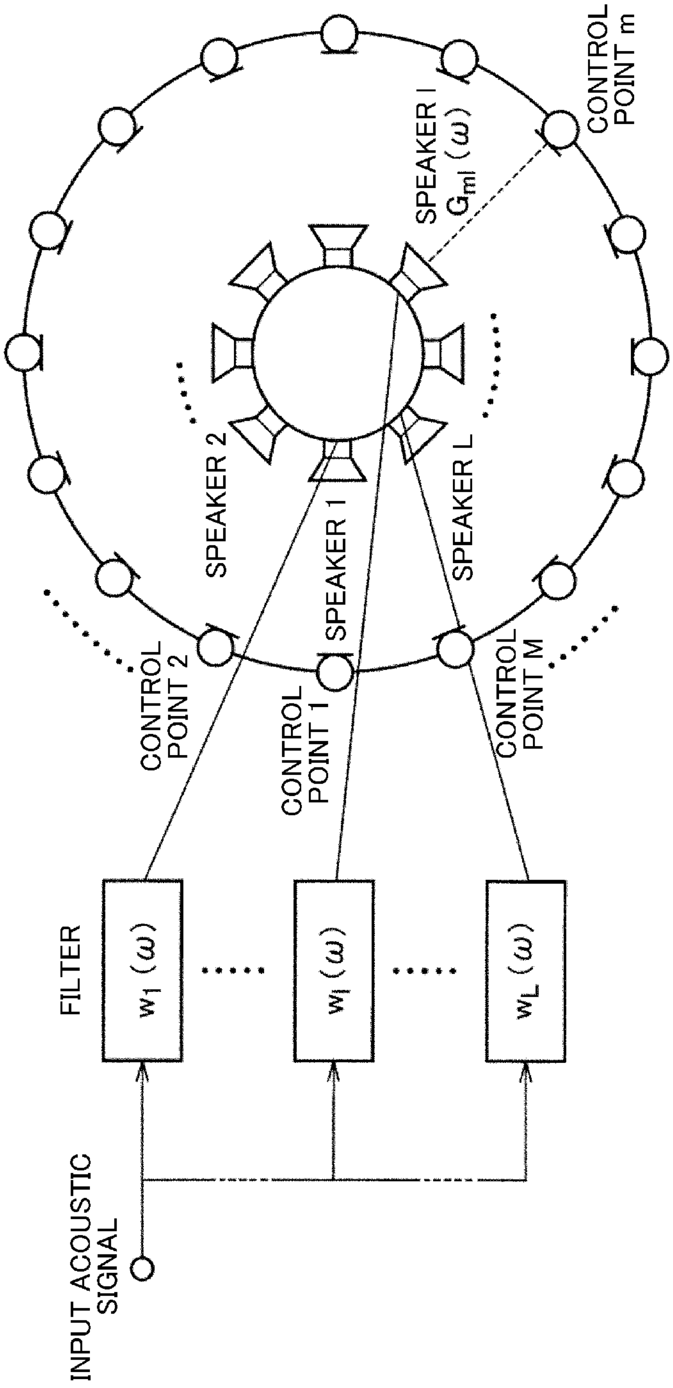
FIG. 7 is a diagram showing an observation system for finding a directivity control filter.

FIG. 5 is a diagram showing a configuration of a sound image localizing device 20 according to the second embodiment, and FIG. 6 is a flowchart showing operations of the sound image localizing device 20. The sound image localizing device 20 according to the second embodiment includes an objective function setting unit 21, a constraint setting unit 22, an optimization unit 23, and a convolution operation unit 24.

The objective function setting unit 21 sets an objective function from a desired directional characteristic, which has been input (step S21-S22 in FIG. 6). It is possible to use, as a representative example, the least square error expressed by Expression (3), which is the sum of squares of errors between the desired directional characteristic d and a directional characteristic $d^O$ observed at each control point. Similarly to the first embodiment, the desired directional characteristic is set on the outside of the sound image localizing device 20.

The constraint setting unit 22 sets a constraint relating to the filter gain (step S23 in FIG. 6). It is also possible to additionally set a constraint relating to directional characteristics based on the desired directional characteristic that has been input (step S21-S23 in FIG. 6). As the constraint relating to the filter gain, a constraint is given that makes the value of the filter gain constant at each frequency similarly to the first embodiment. As an example of the constraint relating to directional characteristics, it is possible to use a constraint that suppresses sound radiation in directions other than a target direction or a constraint that makes frequency response in the target direction constant.

The optimization unit 23 computes a directivity control filter by solving an optimization problem based on the objective function and the constraint, which have been input (step S24 in FIG. 6). The following shows an optimization problem in which the filter gain and the frequency response in the target direction are restricted, taking the least squares method as an example.

$$\begin{cases} \text{minimize} & (d(\omega) - G(\omega)w(\omega))^H (d(\omega) - G(\omega)w(\omega)) \\ \text{subject to} & |w_l(\omega)| = c \\ & G^{point}(\omega)w(\omega) = 1 \end{cases} \quad (10)$$

Here, G(ω) represents a transfer function matrix in which transfer functions from speakers to control points are stored, $w(\omega)=[w_1(\omega), w_2(\omega), \ldots, w_L(\omega)]$ represents a filter coefficient vector in which filter coefficients $w_l(\omega)$ corresponding to the respective speakers are stored, c represents a constant, and $G^{point}(\omega)$ represents a transfer function vector in which transfer functions from the respective speakers to the target direction are stored. A directivity control filter of which the filter gain is suppressed can be computed by solving the optimization problem as that expressed by Expression (10).

The convolution operation unit 24 is similar to that in the first embodiment, and therefore a description thereof is omitted (step S25 in FIG. 6).

As described above, the sound image localizing device 20 according to the second embodiment includes the objective function setting unit 21 that sets an objective function from a desired directional characteristic, the constraint setting unit 22 that sets a linear or non-linear constraint, the optimization unit 23 that computes an optimum filter coefficient from the objective function set by the objective function setting unit 21 and the constraint set by the constraint setting unit 22, and the convolution operation unit 24 that computes an output acoustic signal by performing convolution of an input acoustic signal and the directivity control filter computed by the optimization unit 23. Filters that respectively correspond to speakers constituting a speaker array are computed by the objective function setting unit 21, the constraint setting unit 22, and the optimization unit 23, an acoustic beam is generated using directivity control by the speaker array, and the acoustic beam is caused to be reflected from a wall surface or a ceiling to generate a virtual sound source. Thus, it is possible to provide the sound image localizing device 20 that enables the virtual speaker to reproduce sound in a wide frequency band with high sound quality.

Also, it is desirable that the constraint setting unit 22 sets at least one of a constraint that makes the value of the filter gain constant at each frequency and a constraint relating to directional characteristics that is based on the desired directional characteristic. Thus, desired directional reproduction can be realized.

Note that the present invention can be realized not only as the sound image localizing devices 10 and 20 described above, but also as a sound image localizing method that includes, as steps, functional units that are characteristic to the sound image localizing devices 10 and 20, or a program that causes a computer to execute those steps. It goes without saying that such a program can be distributed via a recording medium such as a CD-ROM or a transmission medium such as the Internet.

REFERENCE SIGNS LIST

10 Sound image localizing device
11 Directivity control filter design unit
12 Filter coefficient correction unit
13 Convolution operation unit
20 Sound image localizing device
21 Objective function setting unit
22 Constraint setting unit
23 Optimization unit
24 Convolution operation unit

The invention claimed is:

1. A sound image localizing device comprising:

a directivity control filter design unit, including one or more processors, configured to compute a directivity control filter from a desired directional characteristic;

a filter coefficient correction unit, including one or more processors, configured to correct the directivity control filter computed by the directivity control filter design unit; and a convolution operation unit, including one or more processors, configured to compute an output acoustic signal by performing convolution of an input acoustic signal and the directivity control filter corrected by the filter coefficient correction unit, wherein filters that respectively correspond to speakers constituting a speaker array are computed by the directivity control filter design unit and the filter coefficient correction unit, an acoustic beam is generated using directivity control by the speaker array, and the acoustic beam is caused to be reflected from a wall surface or a ceiling to generate a virtual sound source.

2. The sound image localizing device according to claim 1, wherein the filter coefficient correction unit is configured to perform computation such that a filter gain becomes constant, the filter gain being an absolute value of a filter coefficient at each frequency.

3. A non-transitory computer readable medium storing one or more instructions for causing a computer to serve as the sound image localizing device according to claim 1.

4. The non-transitory computer readable medium according to claim 3, wherein the filter coefficient correction unit is configured to perform computation such that a filter gain becomes constant, the filter gain being an absolute value of a filter coefficient at each frequency.

5. A sound image localizing method comprising:

a directivity control filter designing step of computing a directivity control filter from a desired directional characteristic;

a filter coefficient correction step of correcting the directivity control filter computed in the directivity control filter designing step; and a convolution operation step of computing an output acoustic signal by performing convolution of an input acoustic signal and the directivity control filter corrected in the filter coefficient correction step, wherein filters that respectively correspond to speakers constituting a speaker array are computed in the directivity control filter designing step and the filter coefficient correction step, an acoustic beam is generated using directivity control by the speaker array, and the acoustic beam is caused to be reflected from a wall surface or a ceiling to generate a virtual sound source.

6. The sound image localizing method according to claim 5, wherein the filter coefficient correction step further comprises:

performing computation such that a filter gain becomes constant, the filter gain being an absolute value of a filter coefficient at each frequency.

* * * * *